United States Patent [19]

Averyanov et al.

[11] 4,312,110
[45] Jan. 26, 1982

[54] AUTOMATIC PALLET-CHANGING METAL-CUTTING MACHINE

[76] Inventors: Oleg I. Averyanov, Leninsky prospekt, 79, kv. 178; Leonid M. Kordysh, Baikalskaya ulitsa, 26, kv. 251, both of Moscow, U.S.S.R.

[21] Appl. No.: 974,080

[22] Filed: Dec. 28, 1978

[51] Int. Cl.³ ............... B23Q 3/157; B23Q 41/02; B65G 67/00
[52] U.S. Cl. ............... 29/568; 29/33 P; 29/563; 198/472; 408/71; 409/159
[58] Field of Search ............... 29/568, 563, 33 P; 408/71; 198/472; 409/159, 172

[56] References Cited

U.S. PATENT DOCUMENTS

| | | | |
|---|---|---|---|
| 3,527,087 | 9/1970 | Converse et al. | 198/472 X |
| 4,090,287 | 3/1978 | Selander | 29/568 |
| 4,116,324 | 9/1978 | Burmeister | 198/472 |

*Primary Examiner*—Z. R. Bilinsky
*Attorney, Agent, or Firm*—Myron Greenspan

[57] ABSTRACT

A metal-cutting machine includes a bed with slideways, a movable unit with a headstock and a drive for moving it in a horizontal plane over the bed slideways, a work table with stock guides for moving the pallets carrying the workpieces and provided with coupling members for gripping the pallets, at least one platform installed before the work table in the direction of movement of the workpieces and is provided with stock guides for the pallets. The platform and work table are arranged for movement relative to each other in a horizontal plane so that when the pallet moves to and from the working position the stock guides of the platform serve as a continuation of the stock guides of the work table. The machine also incorporates a device for gripping the pallet in order to move it over the stock guides of the platform and work table to and from the working position. The pallet-gripping device is installed on the movable unit of the machine at the side facing the pallet with the workpiece, the drive moving the pallet to and from the working position with the aid of the pallet-gripping device being constituted by the drive of the movable unit of the machine.

6 Claims, 12 Drawing Figures

AUTOMATIC PALLET-CHANGING METAL-CUTTING MACHINE

The present invention relates to metal-cutting machines and more particularly it relates to automatic pallet-changing metal-cutting machines.

The present invention is most useful in metal-cutting machines which include means for changing pallets for machining hollow-body parts and with numerical control system.

Known in the prior art is a metal-cutting machine with an automated change of pallets means (Mod. 1100 manufactured by "Mandelli", Italy).

The prior art metal-cutting machine comprises a bed with slideways, a movable unit with a headstock provided with a drive for moving it horizontally over the bed slideways, a work table with stock guides for moving the pallets with workpieces secured thereto, at least one platform located before the work table in the direction of movement of the workpieces and provided with stock guides for the pallets. The platform is mounted for movement relative to the work table in a horizontal plane so that when the pallets move to and from the working position the stock guides of the platform serve as a continuation of the stock guides of the work table. The machine is provided with a device for gripping the pallet as it moves over the stock guides of the platform and work table to and from the working position. For gripping the pallets, coupling members are provided. The pallet-gripping device is mounted on each platform. This device, whether empty or carrying a pallet, is moved by a special drive mechanism likewise mounted on the platform.

Also known in the prior art is a metal-cutting machine with automatic change of pallets means (for example Series nb-h, manufactured by "Hüller—Hille", Federal Republic of Germany) which differs from the above-mentioned machine in that the platform with the stock guides for the pallets is stationary whereas the work table with the stock guides for the pallets is capable of moving horizontally relative to the platform so that when the pallets are moving to and from the working position the stock guides of the work table serve as a continuation of the stock guides of the platform. In this machine the pallet-gripping device and a special drive mechanism for moving said device, including movement with the pallet, are mounted on the platform.

In all the cases mentioned above each drive mechanism of the pallet-gripping device should have a considerable travel which must be somewhat larger than the size of the work table in the direction of pallet movement. The long-stroke drive mechanisms for moving the pallet-gripping devices usually consist of hydraulic cylinders with a conveyor type chain transmissions of the "lift-and-move" principle.

Thus, the prior art machines incorporate special drive mechanisms for moving the pallets from the platforms to the work table and back; these mechanisms increase the amount of labour for manufacturing the machine, raise its cost, and complicate its control, electric and hydraulic systems.

An object of the present invention is to provide a metal-cutting machine wherein there would be no special drive mechanisms for moving the pallets from the platform to the work table of the machine and back, thus promoting reliability of the machine at the same time reducing the manufacturing and operating expenses.

According to this and other objects the present invention comprises a the metal-cutting machine having a bed with slideways, a movable unit with a headstock, provided with a drive for moving said unit horizontally over the bed slideways, a work table with stock guides for moving the pallets which carry the workpieces and are provided with coupling members for engaging the pallets, at least one platform mounted before the work table in the direction of movement of the workpieces and having stock guides for the pallets, said platform and work table being mounted for horizontal movement relative to each other so that when the pallets are moving to and from the working position the stock guides of the platform serve as a continuation of the stock guides of the work table, and a device for gripping the pallet in order to move it over the stock guides of the platform and work table to and from the working position, located on the movable unit of the machine at the side facing the pallet with the workpiece, the drive which moves the pallet to and from the working position by means of the pallet-gripping device being constituted by the drive of said movable unit of the machine.

In this layout the metal-cutting machine of the invention is equipped with an automatic pallet-changing device which, while retaining all the advantages of these devices, features a far simpler design and calls for a smaller amount of labour in its manufacture.

It is expedient that the pallet-gripping device be mounted on the headstock capable of moving in a horizontal plane.

When the pallet-gripping device is installed on the headstock, the device is usually located in the zone nearest to the work table carrying the pallet and thus it can have a minimum travel from the point of its attachment to the movable unit of the machine.

A still greater effect is obtained when the pallet-gripping device is mounted in the spindle socket, when the pallet-gripping device has the form of a bar with an extension at one end which has a surface mating with the surface of the socket of the headstock spindle while its other end has a coupling member engaging the coupling member of the pallet because in this case the above-stated advantages are augmented by the ease of installation and change of the device.

As an alternative the pallet-gripping device may take the form of a hollow bar accommodating a rod mounted inside for movement axially relative to said bar, said rod being fixed in preset positions and provided with a coupling member at the side facing the pallet, the bar having an extension with a surface mating with the surface of the socket of the headstock spindle.

The aforementioned layout of the pallet-gripping device gives an additional effect due to a smaller length of the device which, for example, facilitates its storage in a tool storage magazine.

It is desirable that the coupling member of the pallet-gripping device be made in the form of an L-shaped bar capable of turning through a fixed angle.

It is recommended that the device be provided with a numerical control system and an automatic tool-change system operated by the numerical control system in which case the pallet-gripping device should have a surface mating with the surface of the grab of the mechanical manipulating arm of the automatic tool-changer.

This ensures the greatest effect and the least waste of time in transferring the pallet-gripping device from the tool storage magazine into the spindle and back.

Other objects and advantages of the invention will become more apparent from the description of an embodiment which follows and from the accompanying drawings in which.

The metal-cutting machine according to the invention comprises a bed 1 (FIG. 1) rigidly fixed on a foundation and carrying horizontal slideways 2 for a movable column 3 with vertical slideways (not shown) mounted on which is a headstock 4 with a spindle 5. The axis of the spindle 5 is parallel with the slideways 2 of the bed 1 for the movement of the column 3.

Figure 1:
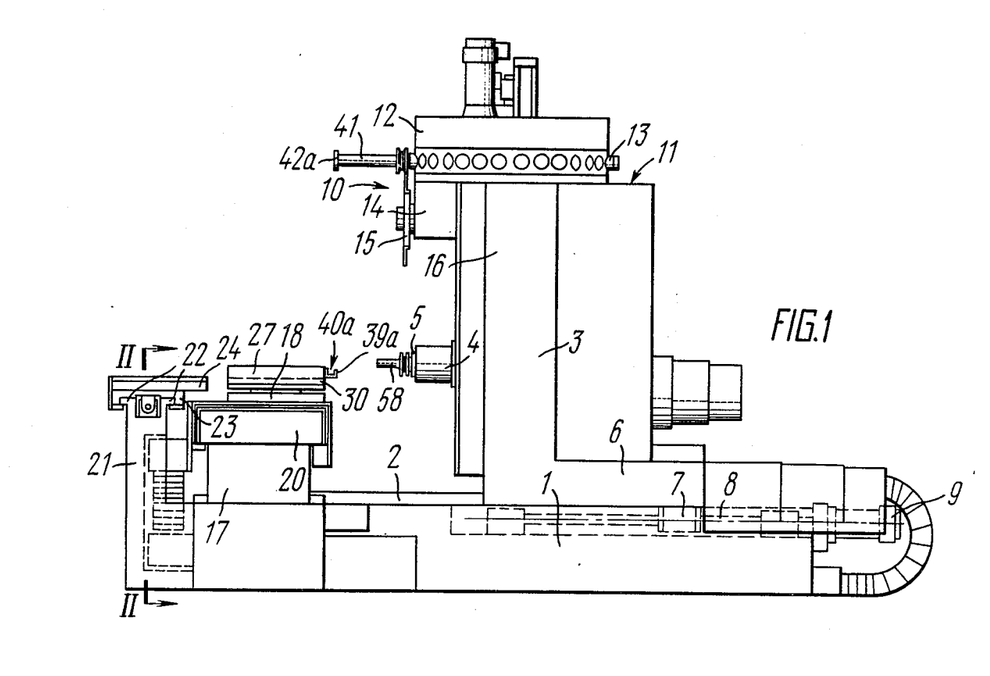
FIG. 1 is a schematic side view of a metal-cutting machine according to the invention.

Fixed on a base 6 of the column 3 is a nut 7 interacting with a screw 8 of a column drive mechanism, said screw being driven by an electric motor 9.

The machine is provided with an automatic toolchanger 10 comprising a tool storage magazine 12 located on the upper end 11 of the column 3 and having sockets 13 for the mandrels with cutting tools (not shown in the drawing) and a transfer unit 14 mounted on the upper portion 16 of the column 3 and provided with a two-arm lever 15 each arm of which has a device for extracting the tool from said magazine 12 and installing it into the spindle 5 or vice versa.

Figure 2:
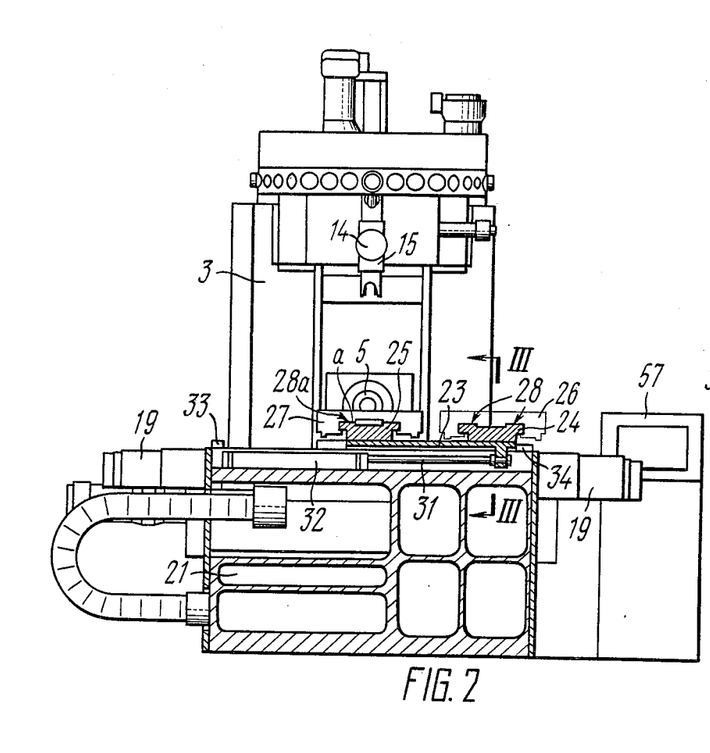
FIG. 2 is a section taken along line II—II in FIG. 1.

Arranged perpendicularly to the axis of the spindle 5 and slideways 2 of the column 3 on the transverse part 17 of the bed 1 are guides (not shown) for the movement of the work table 18 which are protected by telescopic protective shields 19 (FIG. 2). The guides for the work table 18 (FIG. 1) carry the base 20.

Figure 3:
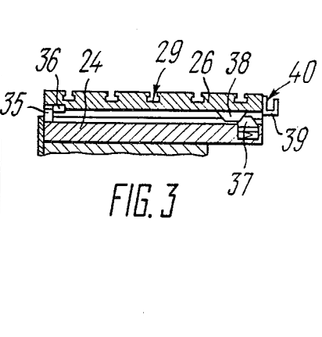
FIG. 3 is a section taken along line III—III in FIG. 2.

In this embodiment of the invention there is a pillar 21 joined to the transverse part 17 of the bed 1, and provided with guides 22 for the saddle 23, said guides being parallel to the guides of the work table 18. Installed on the saddle 23 are two platforms 24 and 25 (FIG. 2) for carrying pallets 26 and 27. The platforms 24 and 25 are provided with stock guides 28 and 28a on which the corresponding pallets 27 and 26 are installed. The surface of the pallets 26 and 27 is provided with, say, T-shaped slots 29 (FIG. 3) for fastening the workpieces. The work table 18 (FIG. 1) also has stock guides 30 identical with the stock guides 28 (FIG. 2) of the platform 24 and stock guides 28a of the platform 25 and a device for fixing and clamping the pallets 26 and 27 on the work table 18, said device being omitted in the drawing in order not to obscure the substance of the invention.

The saddle 23 is rigidly connected with the rod 31 of a hydraulic cylinder 32 fixed on the pillar 21 and intended to move the saddle 23 over the guides 22 (FIG. 1) of the pillar 21. The travel of the carriage 23 is limited by stops 33 (FIG. 2) and 34 which are made in such a manner that when the saddle 23 comes to bear against the stop 34, the platform 25 comes to a position in which the stock guides 28a of the platform 25 are a continuation of the stock guides 30 (FIG. 1) of the work table 18 in the pallet-changing position which is a certain middle position relative to the travel of the saddle 23 in which the axis of the spindle 5 may either coincide with or be near to the axis of symmetry of the work table 18. When the saddle 23 comes to bear against the stop 33 (FIG. 2), the platform 24 comes to a position in which the stock guides 28 are a continuation of the stock guides 30 (FIG. 1) of the work table 18 occupying the same pallet-change position. The stops 33 and 34 (FIG. 2) are installed on the pillar 21.

Each of the platforms 24 and 25 has a rigid stop 35 (FIG. 3) for interacting with, say, the stop 36 of the pallet 26. Besides, mounted on each platform, e.g. 24, is a spring-loaded stop 37 interacting with the rigid stop 38 secured on the pallet 26. The stops 37 and 38 each has two-sided bevels so that the stop 38 can sink the stop 37 when the stop 38 is moving above the stop 37 during the movement of the pallet 26 from the platform 24 onto the work table 18 (FIG. 1) and back. The stop 36 (FIG. 3) is set in such a manner that it moves above or on the side of the stop 37 without contacting it.

Secured on the pallets 26 and 27 (FIG. 4) at the side facing the spindle 5 (when the pallet is located on the platform) are coupling members in the form of brackets 39 and 39a provided respectively, with slots 40 and 40a which are perpendicular to the axis of the spindle 5.

Figure 4:
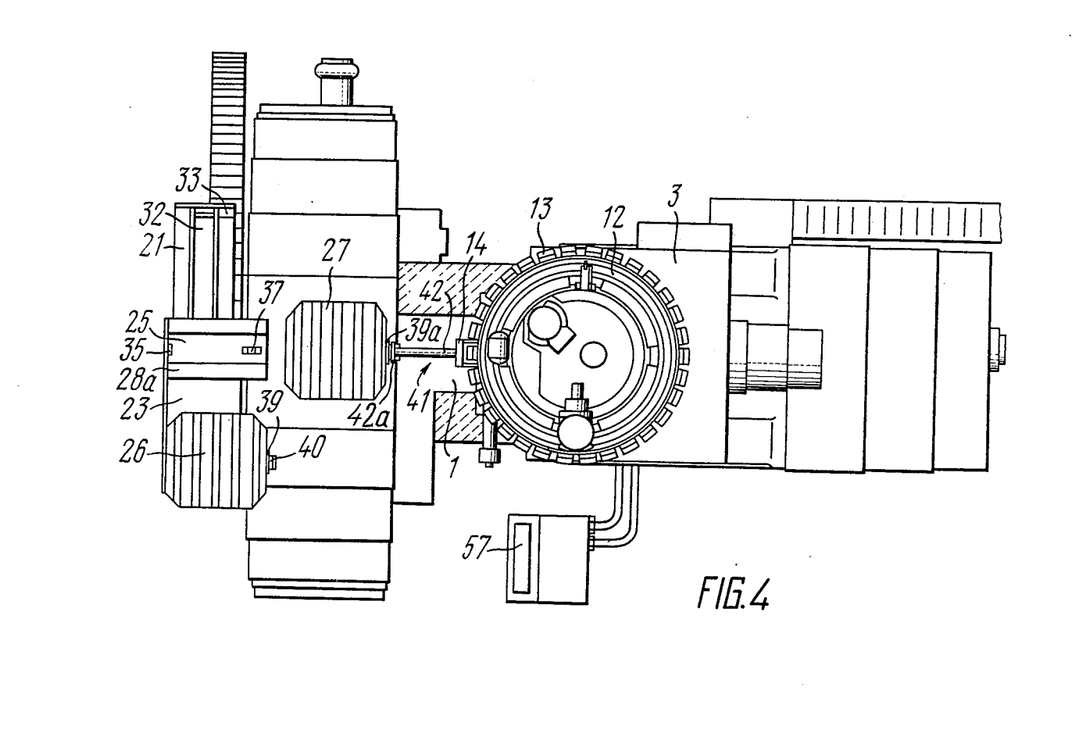
FIG. 4 is a plan view of the metal-cutting machine according to the invention.
Figure 5:
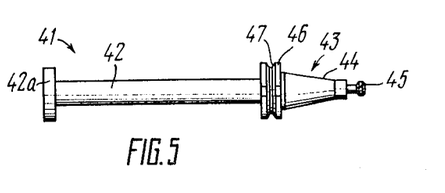
FIG. 5 is an enlarged view of a pallet-gripping device.

The pallet-gripping device 41 (FIG. 5) comprises a bar 42, a coupling member in the form of a flat disc 42a interacting with the slots 40 and 40a (FIG. 4) of the brackets 39 and 39a, and an extension 43 (FIG. 5).

Figure 6:
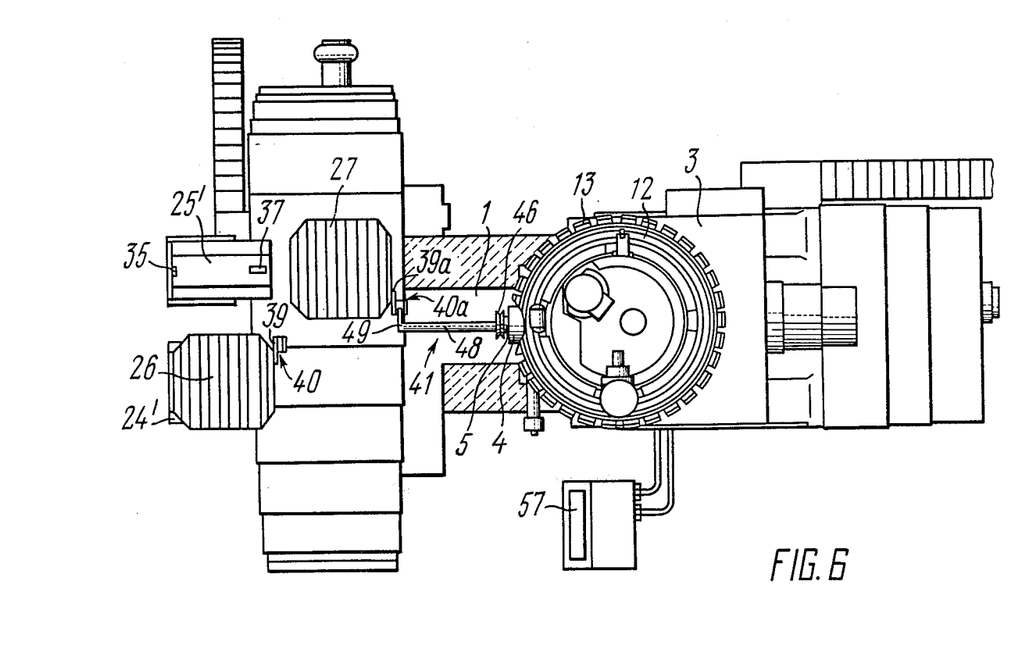
FIG. 6 is a plan view of the metal-cutting machine according to the invention, with an L-shaped pallet-gripping device and stationary platforms.
Figure 7:
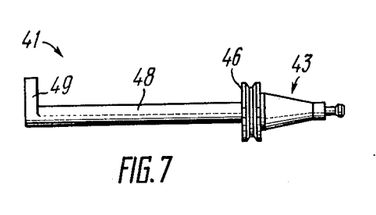
FIG. 7 shows an enlarged view of the L-shaped pallet-gripping device.
Figure 8:
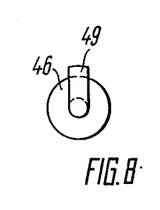
FIG. 8 is a side view of the device illustrated in FIG. 7.

The extension 43 consists of a tapered surface 44 (FIG. 5) mating with the socket of the spindle 5 (FIG. 1), a "mushroom" 45 interacting with the mechanism for gripping the tool in the spindle and a flange 46 provided with a tapered recess 47 interacting with the gripping devices of the lever 15 (FIG. 1). The pallet-gripping device 41 (FIG. 6) consists of a coupling member in the form of an L-shaped bar 48 one end of which 49 interacts with the slot 40 (FIG. 6) or 40a of the brackets 39 and 39a, and an extension 43 (FIG. 7). The shape of the coupling member (L-shaped bar) allows it to enter alternately the slot 40 and 40a (FIG. 6) of the brackets 39 and 39a of the pallets 26 and 27 when said L-shaped bar 48 turns through an angle of 180° or close to it.

Figure 9:
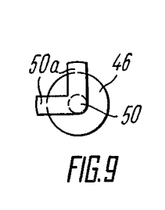
FIG. 9 is a side view of another version of the L-shaped pallet-gripping device.

Such a design of the coupling member will be effective in a machine with stationary platforms 24' and 25' m. The use of the L-shaped bar 50 (FIG. 9) with a bifurcated end 50a makes it possible to decrease its turning angle required for disengaging the coupling member of one pallet and engaging the coupling member of another pallet. The L-shaped bar 48 (FIG. 7) or 50 (FIG. 9) can be turned by the spindle 5 (FIG. 6)

having at least two fixed angular positions. Such machines with numerical control system and an automatic tool-change system have, as a rule, one fixed position of the spindle in which the tool is changed. There is no difficulty in ensuring a second fixed position, particularly when these positions are obtained with the aid of feedback transmitters (e.g. resolver) as provided in some modern machines.

At the same time the L-shaped bars 48 (FIG. 7) or 50 (FIG. 9) may be made pivotable and be fixed in the preset angular positions relative to the extension 43 of the device which means that the turning of the coupling member does not require an angular turning of the spindle. The design of the pivotable coupling member which can be fixed in one or more angular positions in various devices is commonly known and is not dealt with herein in order not to obscure the basic substance of the invention.

Figure 10:
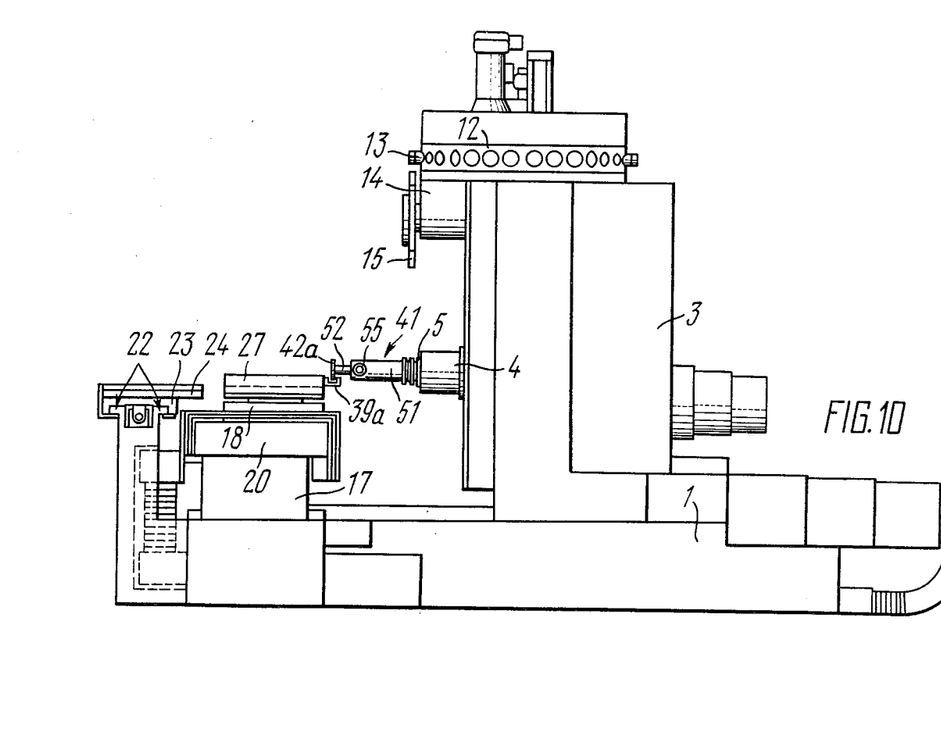
FIG. 10 is a side view of the metal-cutting machine according to the invention with the pallet-gripping device in the form of a housing with an extensible bar.

To reduce the length of the pallet-gripping device in the non-working position, for example for placing it into the tool storage magazine, the device 41 (FIGS. 10, 11) consists of a hollow bar 51 provided with an extension 43. Located in a recess of the bar 51 is a rod 52 whose front end carries a coupling member in the form of a flat disc 42a while the cylindrical surface of the rod 52 is provided with radial recesses 53 and 53' interacting with springloaded retainers 54 installed in the front part of the bar 51.

Figure 11:
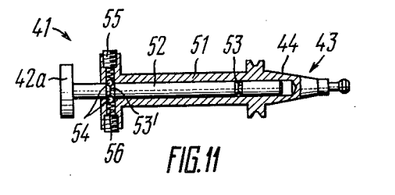
FIG. 11 is an enlarged view of a longitudinal section of the pallet-gripping device in the form of a housing with an extensible bar in the idle position.

The distance between the recesses 53 and 53' depends on the required axial travel of the rod 52.

The springs 56 are set by means of adjustable stops 55 so that the force required for moving the rod 52 relative to the bar 51 of the device 41 would be greater than the force required for moving the pallets 26 and 27 (FIG. 2) over the stock guides of the platforms and work table.

Figure 12:
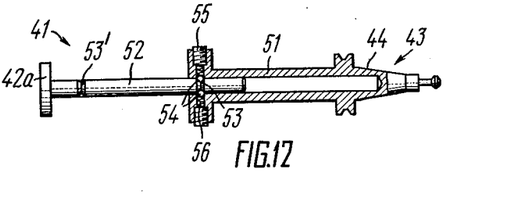
FIG. 12—is similar to FIG. 11 but showing the device in a working position.

FIG. 12 shows the same device for gripping the pallet and transferring it from the platform to the work table and back.

All the motions of the above-described units and mechanisms are effected in accordance with a preset program by the numerical control system 57 (FIG. 2) whose type and configuration bear no essential influence on the substance of the invention.

The functioning of the metal-cutting machine according to the present invention can be illustrated most comprehensively by FIGS. 1, 4 and 6.

These figures show the units of the machine in a position when it is necessary to change the pallets 26 and 27 of which the first one is mounted on the platform 24 and the other one, on the work table 18 of the machine. To facilitate understanding of the drawings, the blanks carried by the pallets are not shown. The pallet-gripping device 41 is at the moment in the tool storage magazine 12 where it forms part of the required tool set.

On order of the numerical control system 57 for changing the pallets, the work table 18 is brought to the loading position wherein the saddle 23 is mounted on the rigid stop 34, while the stock guides 28a of the platform 25 form a continuation of the stock guides 30 of the work table 18.

The socket 13 of the tool storage magazine 12 accommodating the pallet-gripping device 41 is moved to a position from which the transfer unit 14 can transfer said device into the spindle 5 in exchange for some kind of tool mandrel 58 previously located therein.

The machine column 3 is brought to a position in which the distance from the end of the spindle 5 to the slot 40a of the bracket 39a of the coupling member of the pallet 27 corresponds to the travel of the disk 42a of the device 41. The travel of the coupling member depends on the relative positions of the units on the machine and their displacement.

This position of the units and mechanisms of the machine is shown in FIGS. 1 and 4.

Then the headstock 4 moves upward to the tool-change position and the two-arm lever 15 of the transfer unit 14 transfers the pallet-gripping device 41 into the spindle 5 in exchange for the tool mandrel 58 which is returned into the tool storage magazine 12. After the device 41 has been mounted in the spindle 5, the headstock 4 is brought to a position in which the disc 42a of the device 41 gets in line with the slot 40a of the bracket 39a of the coupling member of the pallet 27. The pallet 27 is installed on the work table 18 and the pillar 3 starts moving forward, being driven by the electric motor 9 via the screw 8 of the column drive mechanism and moves the pallet 27 via the disc 42a of the device 41 over the stock guides 30 and 28a from the work table 18 onto the platform 25. The movement of the column 3 ceases when the stop 36 (FIG. 3) comes against the platform stop 35 with a small clearance.

Interacting with the back bevel (FIG. 3) of the pallet stop 38, the spring-loaded stop 37 fixes the pallet on the platform and is also used for shifting the pallet on the platform additionally to the stop 35 which restores the original clearance between the disc 42a and the side walls of the slot 40a of the bracket 39a of the pallet 27 and gives a command for operation of the hydraulic cylinder 32 which is folowed by the movement of the saddle 23 close to the rigid stop 35 in which position the stock guides 30 of the work table 18 get in line with the stock guides 28 of the platform 24.

At this instant the bracket 39a of the pallet 27 will disengage from the disc 42a of the coupling member of the pallet-gripping device 41 which at the end of travel of the carriage 23 gets in line with the slot 40 of the bracket 39 of the coupling member of the pallet 26.

Then the column 3 moves backward to the initial position (at which the pallet-changing operation has started) and shifts the pallet 26 onto the work table 18 of the machine.

When the column 3 stops, the pallet 26 is fixed and clamped on the work table 18, the headstock 4 moves to the tool-change position, the device 41 is mounted in the tool storage magazine 12 and the tool required for machining the new blank is installed into the spindle 5. This completes the pallet-changing cycle and the machine can be turned on for machining the blank installed on the pallet 26.

Thus, the pallets are moved from the work table onto the platform and back by using the drive of the movable unit of the machine, in this particular example—column 3.

In FIG. 6 is shown a machine wherein the platforms 24' and 25' for installing the pallets outside of the work table are located on separate stationary pillars (or on a common stationary base). In this case the platform 24' and 25' are symmetrical to the axis of the machine spindle whereas the brackets 39 and 39a of the pallets are displaced from the axis of symmetry of the pallets towards the axis of the spindle through a distance permitting their interaction with the end 49 of the L-shaped bar 48 or with the bifurcated end 50a of the other L-shaped bar 50.

The pallet-change cycle up to the moment of installation of the pallet 26 on the platform 24 is carried out in the same manner as described above. In this case the tool 58 installed in the spindle 5 is exchange for the device 41 (FIG. 7) by bringing the spindle 5 to such an angular position wherein the tool is habitually changed which ensures the required position of the bar 48 relative to the slot 40a of the bracket 39a of the pallet 27.

After the pallet 27 has been installed on the platform 25, the device 41 (FIG. 7) turns jointly with the spindle 5 to the second fixed angular position in which the bracket 39a will disengage from the end 49 and the latter will engage the bracket 39 of the pallet 26. Then the column 3 will move backward and install the pallet 26 on the work table. Application of the tractive force offset relative to the axis of symmetry of the pallet does not interfere with normal operation since the pallets are reliably guided in the lateral direction by the stock guides.

Thus, the use of the pallet-gripping device in combination with the possibility of setting it in fixed angular positions permits the use of charging devices with platforms devoid of any drive mechanisms.

The pallet-gripping device 41 illustrated in FIG. 11 and 12 is used when, in view of the relative arrangement of units and the required motions, the device 41 (FIGS. 5,7-9) proves to be rather long and difficult to keep outside of the machine and to install in the tool storage magazine. In this case the device 41 (FIGS. 11 and 12) is placed into the tool storage magazine, then into the spindle in the retracted position (FIG. 11).

After the disc 42a has been aligned with the slot 40a of the bracket 39a of the pallet 27, the column 3 is moved backward a distance which is equal to the distance between the circular grooves 53 and 53'. In this case the rod 52 is held by the disc 42a with the aid of the bracket 39a and stays in place; then the device 41 is extended and the rod 52 is fixed in the extended position by the spring-loaded retainers 54. Now the pallet 27 is released and unclamped on the work table 18 and replaced by the pallet 26 in compliance with one of the cycles described above. When the pallets are being transferred, the device does not become shorter because the springs 56 exert a force which is greater than the comparatively small force of pallet motion (all the more so when the pallets, as often occurs in the up-to-date machines, move over roller-type guides) and keep the rod 52 against moving in the hollow bar 51.

After the pallet has been installed and clamped on the work table 18, the column 3 moves again forward a distance equal to the distance between the circular grooves 53 and 53'. Inasmuch as the pallet is clamped on the work table, the rod 52 bears with its disc 42a against the inner face of the slot 40 of the bracket 39, overcome the resistance of the spring-loaded retainers 54 and slides into the bar 51 being fixed in the retracted position in which the device 41 is again installed in the tool storage magazine 12.

This ensures convenient realization of the invention in the case when the length of the pallet-gripping device reaches an undesirable value.

The preferred embodiment of the invention disclosed above is given here as an example only, without confining the scope of the invention so that various modifications and changes of the invention are possible provided they do not depart from its function and scope as defined hereinbefore by the following claims.

What is claimed is:

1. A metal-cutting machine, comprising a bed; bed slideways; a movable unit; a headstock located on said movable unit; a drive for moving said movable unit over said bed slideways in a horizontal plane; a work table having stock guides; pallets adapted to carry workpieces; a coupling member mounted on each of said pallets and serving as connecting means for moving the pallet, said stock guides of said work table slidably supporting each of said pallets; at least one platform installed on an opposed side of said work table with reference to said movable unit; stock guides of said platform adapted for slidably supporting each of said pallets, said platform and work table including means for moving said platform and work table relative to each other in a horizontal plane so that when each of said pallets is in the position of moving to the working position and back said stock guides of the platform serve as a continuation of said stock guides of the work table; a device for gripping one of said pallets when the latter moves over said stock guides of the platform and said stock guides of the work table to the working position and back, and located on said movable unit at the side facing one of said pallets, the drive used for moving one of said pallets to and from the working position comprising said drive of said movable unit, said device for gripping one of said pallets being installed on said headstock which is capable of moving in a horizontal plane, said device for gripping one of said pallets being made in the form of a hollow bar, a rod located inside of side hollow bar and arranged for axial movement between fixed predetermined positions, and a coupling member located on said rod at the side facing one of said pallets, an extension of said hollow bar having a surface mating with the surface of the socket of the spindle of said headstock.

2. A metal-cutting macine as claimed in claim 1, wherein said coupling member of said pallet-gripping device is made in the form of an L-shaped bar capable of turning through a fixed angle.

3. A metal-cutting machine as claimed in claim 2 comprising a numerical control system; an automatic tool-changer operated by said numerical control system; a mechanical manipulating arm of said automatic tool-changer; a grab of said mechanical manipulating arm; a surface made on said device for gripping one of said pallets, mating with the surface of said mechanical arm grab.

4. A metal-cutting machine, comprising a bed; bed slideways; a movable unit; a headstock located on said movable unit; a drive for moving said movable unit over said bed slideways in a horizontal plane; a work table having stock guides; pallets adapted to carry workpieces; a coupling member mounted on each of said pallets and serving as connecting means for moving the pallet, said stock guides of said work table slidably supporting each of said pallets; at least one platform installed on an opposed side of said work table with reference to said movable unit; stock guides of said platform adapted for slidably supporting each of said pallets, said platform and work table including means for moving said platform and work table relative to each other in a horizontal plane so that when each of said pallets is in the position of moving to the working position and back said stock guides of the platform serve as a continuation of said stock guides of the work table; a device for gripping one of said pallets when the latter moves over said stock guides of the platform and said stock guides of the work table to the working position and back, and located on said movable unit at the side facing one of said pallets, the drive used for moving one of said pallets to and from the working position comprising said drive of said movable unit, said device for gripping one of said pallets is installed on said headstock which is capable of moving in a horizontal plane, said device for gripping one of said pallets being installed in the socket of the spindle of said headstock and having the form of on extendable telescoping hollow bar and rod having at one end an extension with a surface mating with the surface of the spindle socket of said headstock while its other end is provided with a coupling member engaging said coupling member of said pallet, and said coupling member of said pallet-gripping device being made in the form of an L-shaped bar capable of turning through a preset angle.

5. A metal-cutting machine as claimed in claim 4 comprising: a numerical control system; an automatic tool-changer operated by said numerical control system; a mechanical manipulating arm of said automatic tool-changer; a grab of said mechanical manipulating arm; a surface made on said device for gripping one of said pallets, mating with the surface of said mechanical arm grab.

6. A metal-cutting machine, comprising a bed; bed slideways; a movable unit; a headstock located on said movable unit; a drive for moving said movable unit over said bed slideways in a horizontal plane; a work table having stock guides; pallets adapted to carry workpieces; a coupling member mounted on each of said pallets and serving as connecting means for moving the pallet, said stock guides of said work table slidably supporting each of said pallets; at least one platform installed on an opposed side of said work table with reference to said movable unit; stock guides of said platform adapted for slidably supporting each of said pallets, said platform and work table including means for moving said platform and work table relative to each other in a horizontal plane so that when each of said pallets is in the position of moving to the working position and back said stock guides of the platform serve as a continuation of said stock guides of the work table; a device for gripping one of said pallets when the latter moves over said stock guides of the platform and said stock guides of the work table to the working position and back, and located on said movable unit at the side facing one of said pallets, the drive used for moving one of said pallets to and from the working position comprising said drive of said movable unit, said device for gripping one of said pallets being installed on said headstock which is capable of moving in a horizontal plane and being capable of changing the length thereof and comprises a hollow bar and a rod accommodated for axial movement therein, said rod being furnished with a coupling member for engaging the pallet therewith, said hollow bar being provided with a stop ensuring termination of axial movement of said rod inside said hollow bar in at least two axial positions with a force exceeding that required for moving the pallets from the platform and back onto the machine, said rod being provided with a coupling member for engaging said device with the pallet, and said hollow bar having a surface ensuring its mounting on the movable unit of the machine.

* * * * *